US008617477B2

(12) United States Patent
Báez et al.

(10) Patent No.: US 8,617,477 B2
(45) Date of Patent: Dec. 31, 2013

(54) DESULPHURIZATION OF HYDROCARBON FEEDS USING ELECTROLYTIC HYDROGEN

(75) Inventors: Victor Báez, San Antonio de los Altos (VE); Luiz Felipe D'Elia, San Antonio de los Altos (VE); Gaudy Rodriguez, San Antonio de los Altos (VE); Yolimar Gandica, San Antonio de los Altos (VE)

(73) Assignee: Intevap, S.A., Caracas (VE)

(*) Notice: Subject to any disclaimer, the term of this patent is extended or adjusted under 35 U.S.C. 154(b) by 541 days.

(21) Appl. No.: 12/178,669

(22) Filed: Jul. 24, 2008

(65) Prior Publication Data
US 2010/0018903 A1 Jan. 28, 2010

Related U.S. Application Data (60) Continuation-in-part of application No. 12/142,139, filed on Jun. 19, 2008, now Pat. No. 7,998,341, which is a continuation-in-part of application No. 11/650,083, filed on Jan. 4, 2007, now abandoned, which is a division of application No. 10/984,462, filed on Nov. 8, 2004, now Pat. No. 7,244,351.

(51) Int. Cl.
*C10G 45/00* (2006.01)
(52) U.S. Cl.
USPC .......... 422/186.04; 208/208 R; 205/343; 205/345; 205/413; 205/462; 204/164; 204/168; 204/172; 429/408; 429/422; 429/425; 422/186; 422/186.03; 422/186.18; 422/186.22

(58) Field of Classification Search
USPC ....... 208/208 R; 204/164, 168, 172; 205/343, 205/345, 413, 462; 429/408, 422, 425
See application file for complete search history.

(56) References Cited

U.S. PATENT DOCUMENTS

| 4,888,029 | A | * | 12/1989 | Shiley et al. | 44/622 |
| 5,141,604 | A | * | 8/1992 | Ayers | 205/637 |
| 5,205,841 | A | * | 4/1993 | Vaiman | 95/46 |
| 2006/0102523 | A1 | * | 5/2006 | Baez et al. | 208/209 |

OTHER PUBLICATIONS

Strathmann, H. (2009) Chapter 6: Ion-exchange Membrane Processes in Water Treatment in Sustainable Water for the Future, edited by I. Escobar & A Schafer, Elsevier, 444 pgs.*

* cited by examiner

*Primary Examiner* — Brian McCaig
(74) *Attorney, Agent, or Firm* — Bachman & LaPointe, P.C.

(57) ABSTRACT

An apparatus for removing sulfur from a hydrocarbon feed includes a cell having two compartments and a membrane separating the compartments, wherein one compartment is communicated with a hydrogen source and the other compartment is communicated with the hydrocarbon feed to be treated, wherein the membrane comprises a palladium membrane which is modified to have an additional amount of a mix of palladium and other metals (Ni, Ag, Co and Au) between about $4.62*10^{-3}$ and $1.62*10^{-2}$ g/cm$^2$; and a power source connected across the hydrogen source compartment to generate a current across same, whereby atomic hydrogen is formed from the hydrogen source at a surface of the membrane and diffuses across the membrane to react with the hydrocarbon feed. A process using this apparatus is also provided.

12 Claims, 6 Drawing Sheets

DESULPHURIZATION OF HYDROCARBON FEEDS USING ELECTROLYTIC HYDROGEN

CROSS-REFERENCE TO RELATED APPLICATION

This application is a continuation-in-part of U.S. patent application Ser. No. 12/142,139, filed Jun. 19, 2008, now U.S. Pat. No. 7,998,341, which was a continuation-in-part of application Ser. No. 11/650,083, filed Jan. 4, 2007 now abandoned, which was a division of application Ser. No. 10/984,462, filed Nov. 8, 2004, now U.S. Pat. No. 7,244,351.

BACKGROUND OF THE INVENTION

Environmental regulations are increasingly strict, especially those regarding liquid fuel quality. As a result, fuel sulfur compound content needs to be decreased, close to zero by 2010. This goal must be achieved taking into account operational and economical aspects; otherwise, conventional liquid fuel commercialization will be restricted.

Conventional desulphurization processes (based on pure catalyst) are expensive. Due to this fact and severe operation conditions, some emergent technologies are under development. These new technologies are mainly focused on decreasing capital and operational costs; as a result, the electrochemically assisted hydro-desulphurization processes, via hydrogen permeation, could be an attractive and potential option for desulphurization of hydrocarbon feeds under mild conditions.

Improving these processes in terms of efficiency and effectiveness remains a key concern, and providing such improvements is a primary object of the invention.

Other objects and advantages will appear below.

SUMMARY OF THE INVENTION

According to the invention, the foregoing objects and advantages have been attained.

According to the invention an apparatus for removing sulfur from a hydrocarbon feed is provided, which comprises: a cell having two compartments and a membrane separating the compartments, wherein one compartment is communicated with a hydrogen source and the other compartment is communicated with the hydrocarbon feed to be treated, wherein the membrane comprises a palladium foil which is palladized to have an additional amount of palladium between about $4.62*10^{-3}$ and $1.62*10^{-2}$ g/cm$^2$; and a power source connected across the hydrogen source compartment to generate a current across same, whereby atomic hydrogen is formed from the hydrogen source at a surface of the membrane and diffuses across the membrane to react with the hydrocarbon feed.

Further, a process for removing sulfur from hydrocarbon feeds is also provided, and comprises the steps of: providing a hydrocarbon feed containing sulfur; providing a cell having two compartments and a membrane separating the compartments, wherein the membrane comprises a palladium foil which is palladized to have an additional amount of palladium between about $4.62*10^{-3}$ and $1.62*10^{-2}$ g/cm$^2$; flowing a hydrogen source through one compartment; flowing the hydrocarbon feed through the other compartment; and applying a current across the hydrogen source compartment whereby hydrogen is generated on a surface of the membrane and diffuses through the membrane from the hydrogen source to the hydrocarbon feed, whereby the hydrogen reacts with sulfur to form H$_2$S and provide a treated hydrocarbon.

Still further according to the invention, the palladium can be modified using other metals such as Co, Ag, Au and Ni, and combinations thereof, which influence the activity of the palladium. Nickel is particularly effective in this regard.

BRIEF DESCRIPTION OF THE DRAWINGS

A detailed description of preferred embodiments of the invention follows, with reference to the attached drawings, wherein.

DETAILED DESCRIPTION

The invention relates to improvements in hydrocarbon desulphurization processes using electrolytic hydrogen. Electrolytic hydrogen is transported across a membrane to interact with the feedstock using a method and apparatus as disclosed in commonly owned and co-pending U.S. Ser. No. 11/650,083, filed Jan. 4, 2007, which is a divisional application of U.S. Ser. No. 10/984,462, filed Nov. 8, 2004, now U.S. Pat. No. 7,244,351, both of which are incorporated herein in their entirety by reference.

Figure 1:
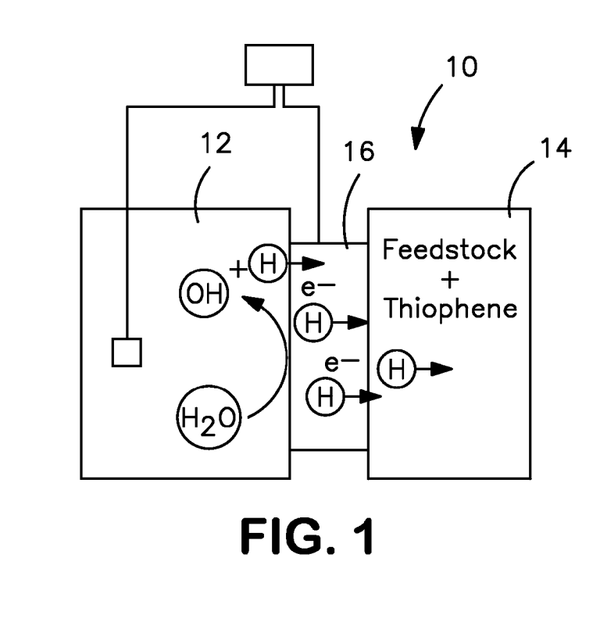
FIGS. 1 and 1a illustrate an apparatus according to the invention.
Figure 1A:
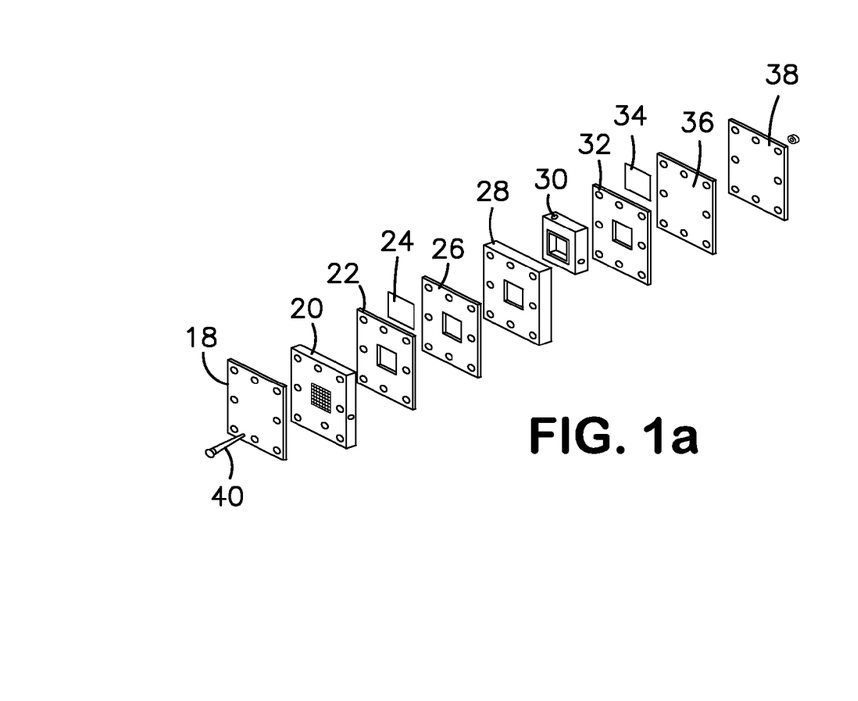

Referring generally to FIG. 1, the invention relates to a reactor 10 having two chambers 12, 14. As described in the aforesaid U.S. Pat. No. 7,244,351, reactions in chamber 12 cause hydrogen to permeate through membrane 16 into chamber 14, where the hydrogen reacts with sulfur species, for example thiophene, in a hydrocarbon feedstock in chamber 14 and helps to remove the sulfur from the feedstock. FIG. 1a is an exploded view of the components of reactor 10. From left to right, reactor 10 can have a stainless steel cover 18, an electrochemical reaction chamber 20 (which provides the function of chamber 12 of FIG. 1), a Teflon sheet 22, a palladium membrane 24 which acts as a working electrode, another Teflon sheet 26, chemical reaction chamber 28 (which provides the function of chamber 14 of FIG. 1), an insulating piece (for example made of Teflon® material) 30 which electrically insulates the metallic parts or compartments, another insulating sheet 32, a platinum sheet 34 as counter electrode, still another Teflon sheet 36, and another stainless steel cover 38. These components can be held together for example using one or more screws 40. The two compartment electrochemical cell is used to transport hydrogen from electrochemical reaction chamber 20 across palladium membrane 24 to chemical reaction chamber 28 where thiophene conversion takes place. Additional detail of FIG. 1 is discussed below. Permeation of hydrogen into reaction chamber 28 is of course a key concern.

The hydrogen permeation process depends on different parameters; such as, applied current, temperature, feedstock concentration and nature of the metallic membrane. The present invention is focused on the hydro-conversion of a sulfur model compound, highlighting the following parameters: (i) chemical and morphological properties of the metallic membrane and (ii) concentration of the sulfur model compound.

Conventional hydro-desulphurization processes based on supported transition metals catalyst (W, Re, Ni—W and Ni—Re supported on pillared clays (PILC), ultra-stable zeolite (USY), activated carbon and alumina ($Al_2O_3$)) have been studied at 400° C. and ambient pressure. Thiophene conversion increases as the Ni content increases; nevertheless, this behavior is dramatically influenced by the nature of the support. Different results in terms of catalyst activity are achieved using pillared clays, ultra-stable zeolite, activated carbon and alumina, all under severe conditions, i.e. high temperature and pressure. The system and method of the present invention avoid such sever conditions.

Electrochemical assisted modification of a Pd membrane with Pt, Au, Cu and Zn was carried out by hydrogen permeation through a Pd membrane (thickness, 50 µm). The modified membrane activities were tested in the 4-methylstyrene hydrogenation reaction under different conditions. Compared to the bare Pd membrane, methylstyrene hydrogenation is improved when the Pd membrane has been modified with Pt and Au; however, the Cu and Zn modified palladium membranes do not have any influence on the methylstyrene conversion. These behaviors are due to the fact that the Cu and Zn presence suppresses the hydrogen permeation through the modified palladium membrane. Additionally, the hydrogen permeation through modified Pd membranes and $Pd_{70}Ag_{30}$ membranes at temperatures between 100 and 350° C. has been studied. At temperatures lower than 200° C., the bulk diffusion through the membrane is the determining step; while at higher temperatures (above 200° C.) the chemical nature of the membrane plays a key role in the process.

The process is to be used as an advantageous option for sulfur removal from hydrocarbon feeds. The reaction is performed under mild conditions, namely under low temperature and pressure. The fundamental concepts regarding this new process are based on the teachings of the aforesaid U.S. Pat. No. 7,244,351. According to the invention, thiophene conversion is enhanced, and this conversion increases as the sulfur concentration in the feed decreases. Thus, the process is well suited to feeds that have sulfur concentrations greater than negligible or trace amounts. Further, it has been found that the process of the present invention is particularly well suited to feeds have sulfur concentration less than 89 ppm, as activity in converting thiophene increases below this concentration. Thus, a preferred feedstock contains greater than trace amounts and less than about 89 ppm of sulfur.

The present invention offers alternatives which could fit into conventional refining schematic processes. These alternatives may help in achieving required fuel quality, can be coupled with existing HDS conventional processes, and can provide ultra-low sulfur content fuel treatment.

Referring again to FIG. 1, two compartments compose the electrochemical cell of the present invention. The main features of the cell are also described in U.S. Pat. No. 7,244,351 as mentioned above. The cell has been modified herein in order to improve surface contact between the palladium membrane and the feedstock. In one design, turbulence promoters were added and the reactor was built using stainless steel.

The electrochemical assisted hydro-desulphurization reaction was evaluated by following the thiophene conversion, considering the effects of the following aspects: (i) palladium content of the palladium membrane; (ii) modification of the palladium membrane with Co, Ni, Ag, Au and (iii) thiophene concentration.

It was determined according to the invention that good results are obtained in terms of conversion of thiophene when the palladium membrane is further loaded with a specific amount of a mix of palladium and, preferably, nickel. Further, it was found that a particular membrane thickness is advantageous in terms of enhancing hydrogen permeation. Further, the process was evaluated from the standpoint of sulfur content in the feedstock, and it was determined that thiophene conversion increases as the concentration of sulfur decreases in the feedstock.

As set forth above, it has been found that excellent results are obtained when the palladium membrane is loaded with further palladium. This is referred to herein as palladization, and such palladization can be carried out by running a reaction for a period of time to deposit palladium on the foil as desired. According to the invention, peak results were obtained at a reaction time of 180 minutes, where about $1.08*10^{-2}$ $g/cm^{-2}$ of palladium had been deposited on the foil. Thiophene conversion rates of over 30% were obtained at loadings of palladium on the membrane of between about $4.62*10^{-3}$ and $1.62*10^{-2}$ $g/cm^2$.

It has further been found according to the invention that the addition of nickel to the palladium loaded palladium foil is beneficial in terms of thiophene conversion activity. In contrast, cobalt, silver and gold were also tested and found to be less than helpful in the desired process.

Further findings were made in connection with the thickness of the palladium foil, which was found to be most desirably about 0.125 mm. Thus, according to the invention, the foil preferably has a thickness of between about 0.04 and 0.3 mm, preferably between about 0.1 and 0.2 mm.

Example 1

Table 1 shows the operating conditions for palladization of a palladium membrane, and conditions used for evaluating the activity of the prepared palladium membranes in the thiophene conversion reaction.

TABLE 1

| Operating conditions | Test | |
| --- | --- | --- |
| | Palladization of palladium membrane | Desulphurization reaction |
| Electrolytic media | NaOH 0.1M | NaOH 0.1M |
| Applied current density, $mA/cm^2$ | −1.93 | Between −2 and −31 |
| Cathode | Pd | Palladized Pd |
| Cathode Thickness (mm) | 0.125 | 0.125 |
| Anode | Pt mesh | Pt mesh |
| Reaction temperature, ° C. | 25 | 40 |
| $PdCl_2$ concentration, M | 0.12 | — |
| Reaction time, min | 30, 90, 180, 360 | 1440 |
| Feedstock | — | 715 ppm of thiophene + n-heptane |

Figure 2:
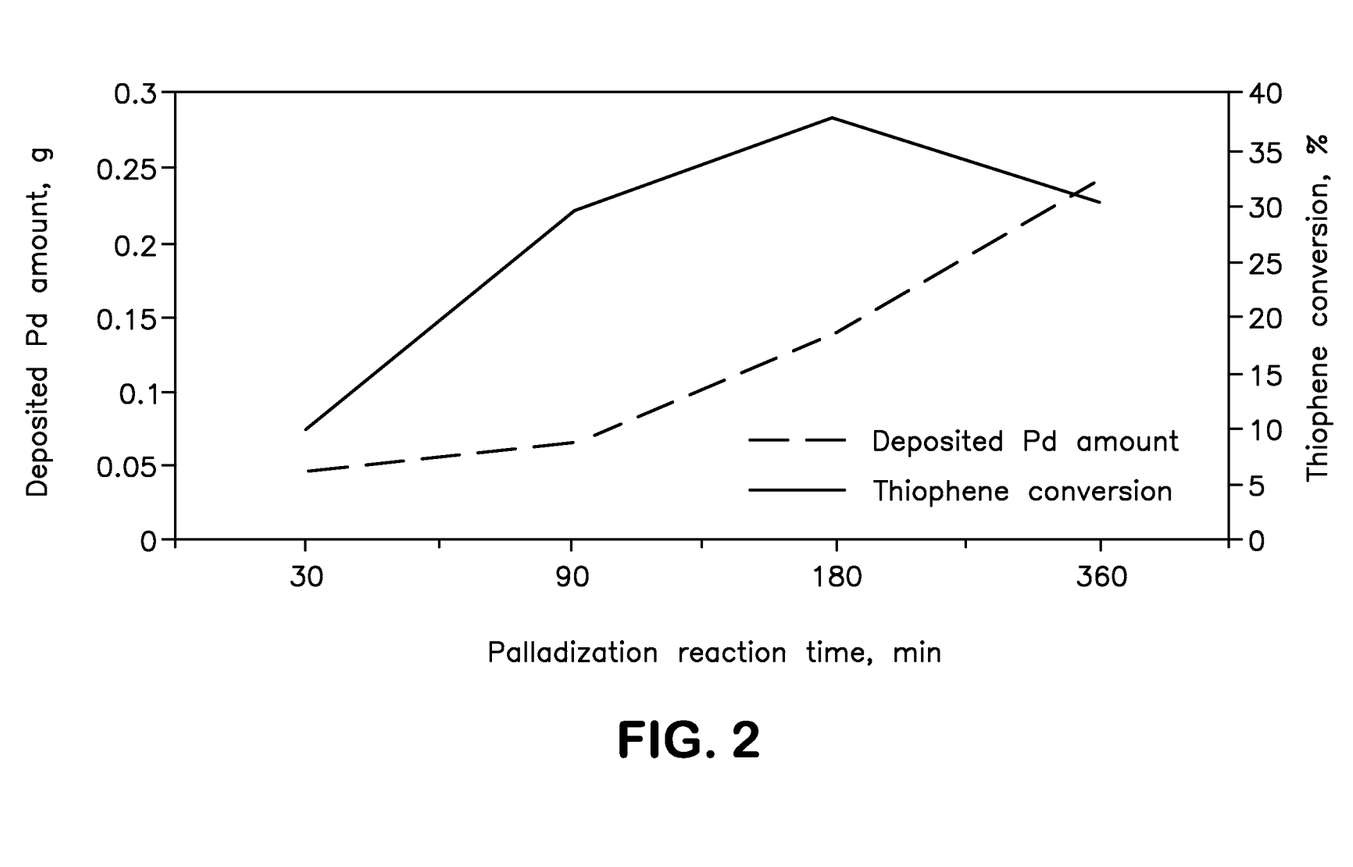
FIG. 2 shows activity for thiophene conversion for different levels of palladium deposit on the foil.

Table 2 shows that the amount of deposited palladium increases as reaction time increases. FIG. 2 clearly shows this behavior, and also demonstrates that thiophene conversion does not increase linearly with the amount of deposited palladium. There is a clear optimum palladium amount where the thiophene conversion reaches a maximum. The thiophene conversion peak is reached when the palladization reaction was performed for 180 min ($1.08*10^{-2}$ $g/cm^{-2}$ of Pd was deposited on the Pd membrane). For further evaluation in the following examples, this palladium amount was chosen as the optimum for the palladium membrane preparation.

TABLE 2

| Palladization reaction time, min | Deposited Pd on the palladium membrane, g |
|---|---|
| 30 | 0.045 |
| 90 | 0.068 |
| 180 | 0.14 |
| 360 | 0.245 |

Example 2

As stated above, 180 min was chosen as the reaction time for the palladization of palladium foils (palladium black). Using this condition the palladization of palladium foils of different thickness were performed. The palladium membranes obtained in this manner were tested for the thiophene conversion reaction under the following conditions: Electrolytic medium: NaOH 0.1M; Current density: −31 mA/cm$^2$; Cathode: Pd/Pd; Palladium membrane thickness: 0.047; 0.125 and 0.25 mm; Anode: Platinum mesh; Reaction temperature: 40° C.; Feedstock: 715 ppm of thiophene+n-heptane; Electrolysis time: 24 h.

Figure 3:
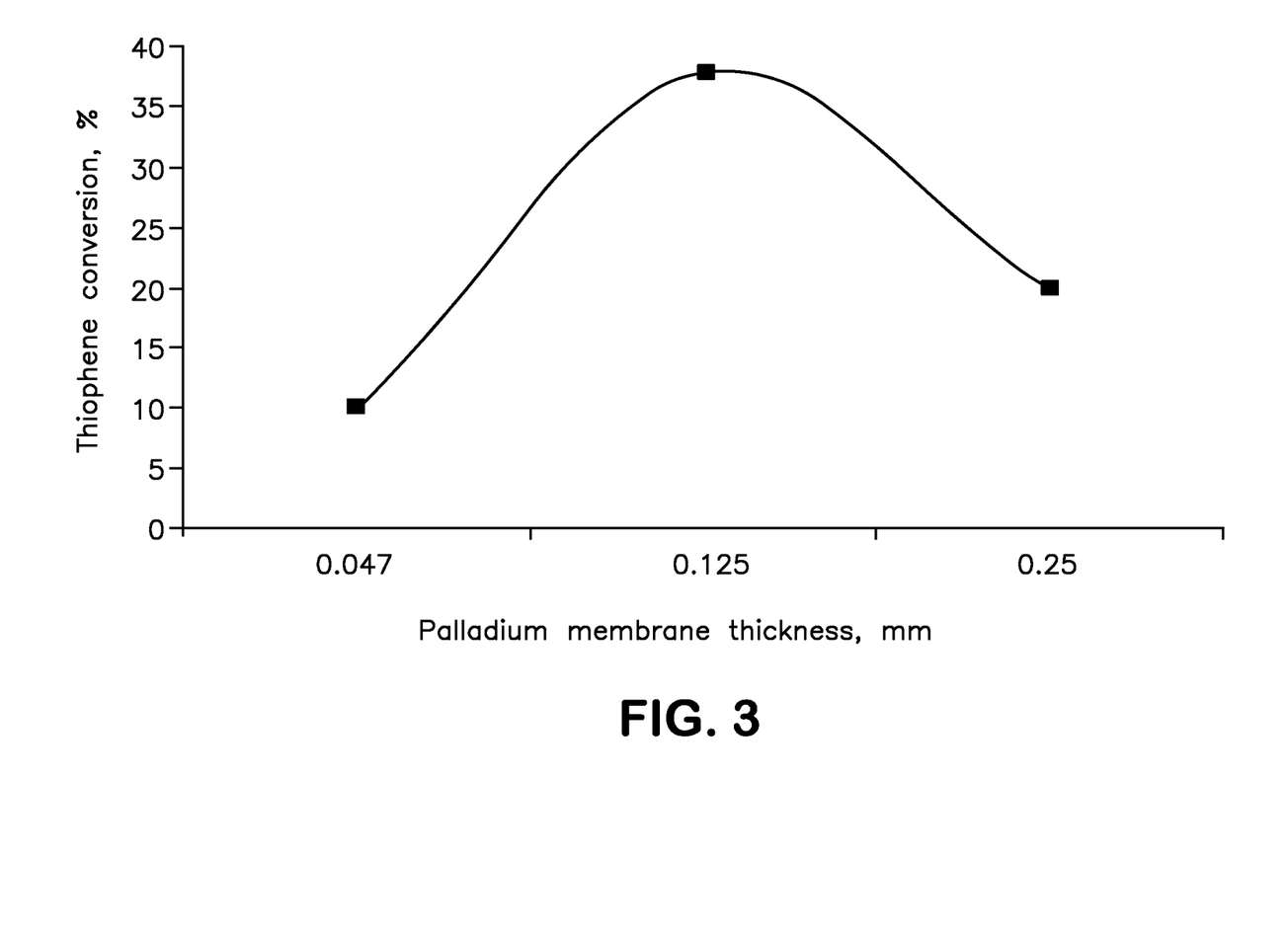
FIG. 3 shows activity for thiophene conversion as a function of membrane thickness.

As shown in Table 3 and FIG. 3, the thiophene conversion does not have a linear relationship with the thickness of the palladium membrane. It is clear, however, that there is an optimum value where the conversion reaches a maximum. An optimum value for the palladium membrane thickness needs to be used in order to ensure the highest thiophene conversion; this conversion peak is achieved using 0.125 mm thickness palladium membrane.

TABLE 3

| Palladium membrane thickness, mm | Palladium deposited, g | Thiophene conversion |
|---|---|---|
| 0.047 | 0.137 | 10 |
| 0.125 | 0.14 | 38 |
| 0.25 | 0.135 | 20 |

Example 3

The effect of thiophene concentration on the conversion was evaluated using a palladium membrane (thickness, 0.125 mm) which was palladized as stated before. The thiophene conversion was performed under the following conditions: Electrolytic medium: NaOH 0.1M; Current density: −31 mA/cm$^2$; Cathode: Pd/Pd; Palladium membrane thickness: 0.125 mm; Anode: Platinum mesh; Reaction temperature: 40° C.; Feedstock: 100 ml of n-heptane+(89, 179, 358 and 715 ppm) sulfur concentration on the thiophene; Electrolysis time: 24 h.

Figure 4:
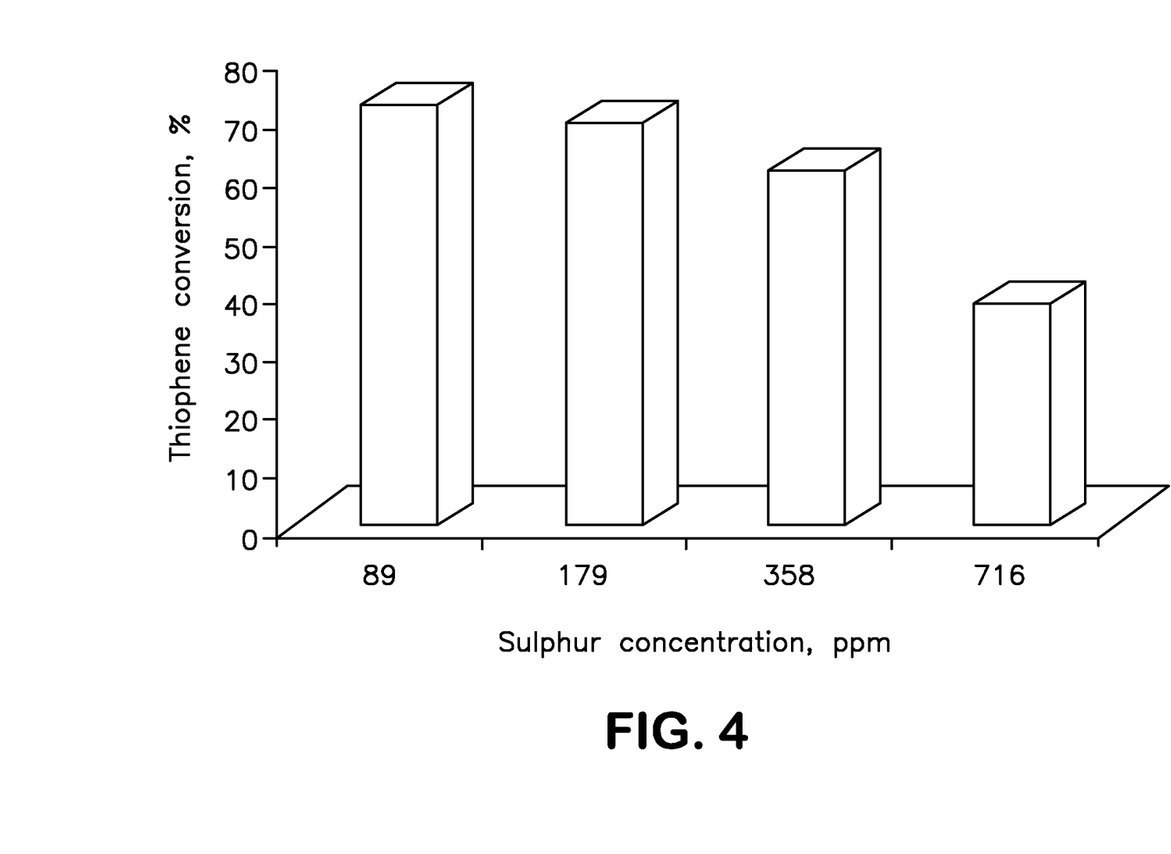
FIG. 4 shows thiophene conversion as a function of sulfur content in the feedstock.

FIG. 4 clearly shows that the thiophene conversion increases as the concentration decreases. The thiophene conversion is favored at sulfur concentrations lower than 89 ppm.

Example 4

A palladium foil (thickness, 0.125 mm) was palladised following the procedure stated above. Co and Ni deposition was carried out under the same conditions used for palladization. Co and Ni were deposited using a reaction time of 10 min. The modified Pd membranes were tested for thiophene conversion under the following experimental conditions: Electrolytic medium: NaOH 0.1M; Current density: −31 mA/cm$^2$; Cathode: Pd/Pd/Co or Ni; Palladium membrane thickness: 0.125 mm; Anode: Platinum mesh; Reaction temperature: 40° C.; Feedstock: 100 ml of n-heptane+715 ppm of thiophene; Electrolysis time: 24 h.

Figure 5:
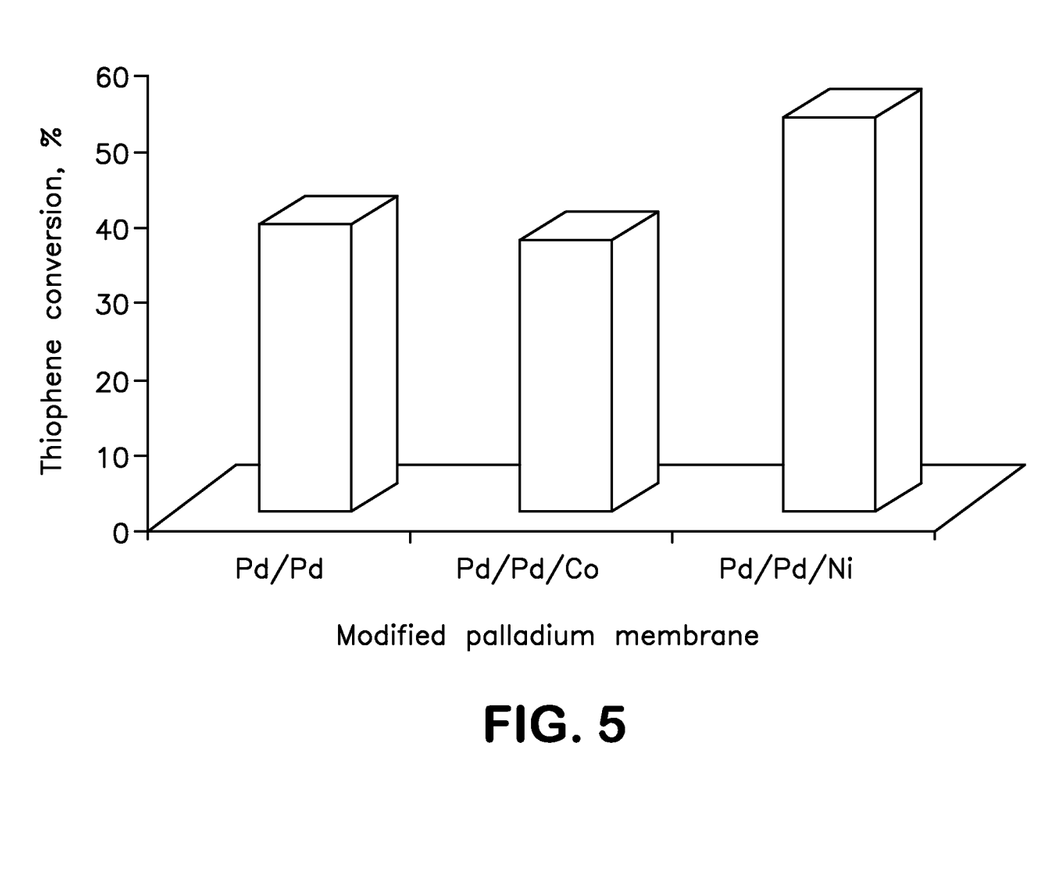
FIG. 5 shows results obtained in terms of thiophene conversion for membranes with Pd/Pd, Pd/Pd/Co and Pd/Pd/Ni.

FIG. 5 shows the effect of the Co and Ni presence on thiophene conversion. The presence of Ni and Co on the Pd/Pd membrane influences the thiophene conversion. Ni increases thiophene conversion, compared to the unmodified Pd/Pd membrane. The conversion was increased by 20% (in other words 58%), when the Pd/Pd membrane was modified with Ni. Cobalt modification does not show similar results, compare to nickel Example 5

A palladium foil (thickness, 0.125 mm) was palladised following the procedure stated above. Ag, Ni and Au deposition was carried out under the same conditions used for palladization. The reaction time used for deposition was 20 min for Ag, Ni and Au. The Pd modified membranes were tested for thiophene conversion under the following experimental conditions: Electrolytic medium: NaOH 0.1 M; Current density: −31 mA/cm$^2$; Cathode: Pd/Pd/Ag, Ni or Au; Palladium membrane thickness: 0.125 mm; Reaction temperature: 40° C.; Feedstock: 100 ml of n-heptane+715 ppm of thiophene; Electrolysis time: 24 h.

Figure 6:
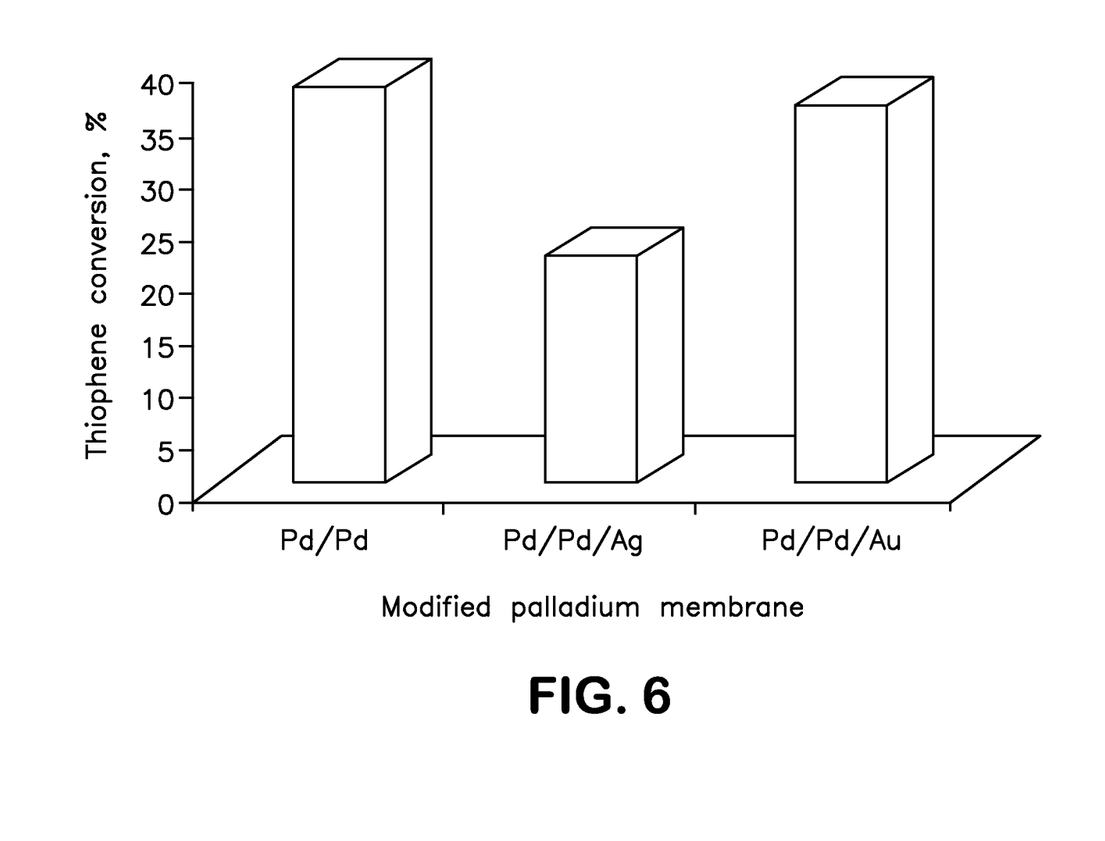
FIG. 6 shows results in terms of thiophene conversion for membranes with Pd/Pd, Pd/Pd/Ag and Pd/Pd/Au.

FIG. 6 shows the effect of the presence of Ag and Au on the thiophene conversion. The presence of Au and Ag on the Pd/Pd membrane negatively influences thiophene conversion. Both metals decreases the reaction efficiency and this may be due to the fact that the deposited metals may suppress the hydrogen permeation rate. This behavior could also be due to irreversible absorption of sulfur molecules that block the active sites. This effect is much stronger for Ag.

Based upon the foregoing, it should be appreciated that a process and apparatus have been provided wherein thiophene conversion are enhanced through use of proper metals and thicknesses on the membrane, as well as feedstocks containing suitable amounts of sulfur.

While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

The invention claimed is:

1. An apparatus for removing sulfur from a hydrocarbon feed, comprising:
   a cell having two compartments and a membrane separating the compartments, wherein one compartment is communicated with a hydrogen source and the other compartment is communicated with the hydrocarbon feed to be treated, wherein the membrane comprises a palladium foil which is palladized to have an additional amount of palladium, and wherein the membrane is electrically conductive and stable as a cathode and is adapted to act as an electrode during an electrolysis process; and
   a power source connected across the hydrogen source compartment to generate a current across same, whereby atomic hydrogen is formed from the hydrogen source at a surface of the membrane and diffuses across the membrane to react with the hydrocarbon feed.

2. The apparatus of claim 1, wherein the palladium membrane has a thickness of between 0.1 and 0.2 mm.

3. The apparatus of claim 1, wherein the palladium membrane is further loaded with nickel.

4. The apparatus of claim 1, wherein the foil contains about $1.08*10^{-2}$ g/cm$^{-2}$ of deposited palladium, wherein the foil has a thickness of about 0.125 mm, and wherein the foil is further loaded with nickel.

5. The apparatus of claim 1, wherein
the additional amount of palladium is between about $4.62*10^{-3}$ and $1.62*10^{-2}$ g/cm$^2$.

6. A method for removing sulfur from hydrocarbon feeds, comprising the steps of:
providing a hydrocarbon feed containing sulfur;
providing a cell having two compartments and a membrane separating the compartments, wherein the membrane comprises a palladium foil which is palladized to have an additional amount of palladium,
flowing a hydrogen source through one compartment;
flowing the hydrocarbon feed through the other compartment; and
applying a current across the hydrogen source compartment whereby hydrogen is generated on a surface of the membrane, which acts as a cathode during said applying, and atomic hydrogen diffuses through the membrane from the hydrogen source to the hydrocarbon feed, whereby the atomic hydrogen reacts with sulfur to form $H_2S$ and provide a treated hydrocarbon.

7. The method of claim 6, wherein the palladium foil has a thickness of between 0.1 and 0.2 mm.

8. The method of claim 6, wherein the palladium foil is further loaded with nickel.

9. The method of claim 6, wherein the foil contains about $1.08*10^{-2}$ g/cm$^{-2}$ of deposited palladium, wherein the foil has a thickness of about 0.125 mm, and wherein the foil is further loaded with nickel.

10. The method of claim 6, wherein the feedstock contains greater than trace amounts and less than about 89 ppm of sulfur.

11. The method of claim 10, wherein the sulfur is in the form of thiophene.

12. The method of claim 6, wherein the additional amount of palladium is between about $4.62*10^{-3}$ and $1.62*10^{-2}$ g/cm$^2$.

* * * * *